(12) United States Patent
Sugiyama

(10) Patent No.: US 7,190,504 B2
(45) Date of Patent: Mar. 13, 2007

(54) ELECTRO-OPTICAL DEVICE AND ELECTRONIC APPARATUS

(75) Inventor: Nobuo Sugiyama, Toyoshina-machi (JP)

(73) Assignee: Seiko Epson Corporation (JP)

( * ) Notice: Subject to any disclaimer, the term of this patent is extended or adjusted under 35 U.S.C. 154(b) by 39 days.

(21) Appl. No.: 10/943,146

(22) Filed: Sep. 16, 2004

(65) Prior Publication Data

US 2005/0099668 A1 May 12, 2005

(30) Foreign Application Priority Data

Sep. 19, 2003 (JP) ............................. 2003-327976

(51) Int. Cl.
G02F 1/03 (2006.01)
G02F 1/29 (2006.01)
G02F 1/1347 (2006.01)
G02B 26/00 (2006.01)

(52) U.S. Cl. ...................... 359/254; 359/245; 359/259; 359/263; 359/267; 359/290; 359/296; 359/298; 359/302; 359/315; 349/78; 349/80; 349/83; 349/84; 349/104; 349/106; 349/108; 349/109; 349/113; 349/123

(58) Field of Classification Search ................ 359/254, 359/265–275, 290, 298, 302, 315, 245–253, 359/259, 263, 296; 349/78, 80, 83, 84, 104, 349/106, 108, 109, 113, 123; 345/48–50, 345/55, 84, 87, 88, 90, 104, 105, 107
See application file for complete search history.

(56) References Cited

U.S. PATENT DOCUMENTS 6,501,521 B2 * 12/2002 Matsushita et al. ......... 349/106
6,801,274 B2 10/2004 Suzuki
6,825,904 B2 11/2004 Kamijyo
6,859,296 B2 * 2/2005 Kawase ....................... 359/237
6,909,479 B2 6/2005 Iijima
2001/0008437 A1 * 7/2001 Fujimori et al. ............ 349/113

FOREIGN PATENT DOCUMENTS

| CN | 1360220 | 7/2002 |
|---|---|---|
| EP | 1 217 421 | 6/2002 |
| EP | 1 279 996 | 1/2003 |
| JP | 2001-066593 | 3/2001 |
| JP | 2002-090724 | 3/2002 |
| JP | 2002-229011 | 8/2002 |
| JP | 2002-311449 | 10/2002 |
| JP | 2003-167244 | 6/2003 |
| JP | 2003-195296 | 7/2003 |
| KR | 2002-51858 | 6/2002 |

OTHER PUBLICATIONS

Communication from European Patent Office re: counterpart application.
Examination result issued in corresponding Korean application.
Communication from Japanese Patent Office regarding counterpart application.

* cited by examiner

Primary Examiner—Evelyn A. Lester
(74) Attorney, Agent, or Firm—Harness, Dickey & Pierce, P.L.C.

(57) ABSTRACT

An electro-optical device is provided comprising an electro-optical material and means for applying an electric field to the electro-optical material, in which a plurality of pixel regions $D_R$, $D_G$ and $D_B$ capable of separately controlling optical states of the electro-optical material are arranged and each pixel region is provided with a light transmitting portion (an aperture portion (212aR, 212aG, and 212aB)) and a light reflecting portion (a reflective surface (212R, 212G, and 212B)). At adjacent pixel regions that are arranged in a predetermined direction, end edges Ea and Eb of each of the light transmitting portions orthogonal to the predetermined arrangement direction are aligned with each other.

1 Claim, 11 Drawing Sheets

ELECTRO-OPTICAL DEVICE AND ELECTRONIC APPARATUS

RELATED APPLICATIONS

This application claims priority to Japanese Patent Application No. 2003-327976 filed Sep. 19, 2003 which is hereby expressly incorporated by reference herein in its entirety.

BACKGROUND

1. Technical Field of the Invention

The present invention relates to an electro-optical device and an electronic apparatus, and more specifically, to a structure of a transflective electro-optical device in which a plurality of pixel regions is arranged and each pixel region is provided with a light transmitting portion and a light reflecting portion.

2. Background Art

Transmissive liquid crystal display devices, reflective liquid crystal display devices and transflective liquid crystal display devices have been conventionally used as liquid crystal display devices used in various electronic apparatuses. Among these devices, transflective liquid crystal devices are configured such that when a backlight is turned on, a transmissive display is visible, and when the backlight is turned off or the circumference is very bright, a reflective display is visible. Accordingly, it is advantageous in that an optimum display can be implemented from the surroundings and that a power consumption of the backlight can be reduced. For these reasons, transflective liquid crystal display devices are widely used in portable electronic apparatuses, such as cellular phones or personal digital assistants.

It is known that a transflective liquid crystal display device comprises a reflective layer which has an aperture portion for every pixel region. Herein, for every pixel region, the aperture portion becomes a light transmitting portion and the remaining portion (other than the aperture portion), where the reflective layer is formed, becomes a light reflecting portion. Many of the light transmitting portions have one or two island shapes formed for every pixel region. An aperture ratio of the light transmitting portion in each pixel region is set in consideration of a balance between the transmissive display and the reflective display. Herein, a liquid crystal display device comprising color filters is provided with colored layers providing different color tones at adjacent pixel regions, and the aperture ratios of the light transmitting portions are adjusted in accordance with the color tones of the colored layers. Accordingly, the areas of the light transmitting portions in the adjacent pixel regions, each having a colored layer of a different color tone, are different from each other.

For example, FIG. 6 shows a pixel arrangement of a liquid crystal display device having color filters which are arranged in a stripe shape, that is, R, G and B pixels being sequentially arranged in a diagrammatically horizontal direction. Herein, in each pixel region, one aperture portion is formed at its central part to form the light transmitting portion, and the light reflecting portions are arranged at both vertical sides of the light transmitting portion. Each pixel region of R, G and B, which are arranged in the diagrammatically horizontal direction, has a light transmitting portion with an area different from each other. Further, the light reflecting portion is provided with a color filter aperture (a part in which the colored layer is not formed) having a suitable size. The color filter aperture is intended to adjust the saturation or luminosity of the reflective display.

However, in a conventional liquid crystal display device, since the areas of the light transmitting portions in the adjacent pixel regions as described above are different from each other, blurring of contours is generated in various displays and clearness in display quality is generally lacking. For example, as shown in FIG. 6, each pixel region may be rectangular which is long in a diagrammatically vertical direction and short in a diagrammatically horizontal direction. In this case, when the area of the aperture portion is adjusted, there is enough space that the length in the diagrammatically vertical direction may be changed. For this reason, the lengths of the aperture portion in the diagrammatically vertical direction are configured, to be different from each other between the adjacent pixel regions in the diagrammatically horizontal direction. Accordingly, between the adjacent pixel regions in the diagrammatically horizontal direction, the upper edge positions and lower edge positions of the light transmitting portions are configured to have an uneven shape due to a step difference in a diagrammatically vertical direction according to the difference of the areas of the light transmitting portions. Hence, if an outer edge of a display format extending in the diagrammatically horizontal direction is constituted, a contour line of the outer edge has an uneven shape due to the step difference of the upper and lower edge portions of the light transmitting portions. As a result, there is a problem in that the blurring of the display contours may result.

Further, various problems are also presented in different circumstances. For example, as shown in FIG. 6(A), when a black character is displayed against a white background for the transmissive display, a pair of minute black lines (which is constituted by the light reflecting portion of a pixel of white display) extending especially from an end portion of a black line toward a diagrammatically horizontal direction may be visible. The pair of minute black lines also extends in a zigzag shape according to the size of the light transmitting portion, so that it is likely to come into view. This results in an increase of the blurring of the display contours. In comparison, when a white character is displayed against a black background, a white line is more finely visible than a black line, and the size of the white line extending in a horizontal direction changes into an uneven shape. For this reason, a slight blurring of the display contours may be generated.

Further, as shown in FIG. 6(B), when a black character is displayed against a white background in the reflective display, the light transmitting portion of the white display is visible and extends in an uneven shape and consecutively in a minute black line shape at the end portion of the black line, so that the blurring of the display contours is highlighted. Further, when a white character is displayed against a black background, the blurring of the contours is weak, but a white line is visible and disconnected.

As described above, in the conventional electro-optical device, the blurring of the display contours is generated by forming the light transmitting portion and the light reflecting portion in every pixel region. In particular, since the edge portions of the light transmitting portions are provided at different positions between the adjacent pixel regions, there is a problem in that the blurring of the display contours is highlighted.

Hence, the present invention is designed to solve these problems, and it is an object of the present invention to reduce the blurring of the display contours caused by the light transmitting portion provided in every pixel region, and to improve the display quality of both the transmissive display and the reflective display in a transflective electro-optical device having a light transmitting portion and a light reflecting portion formed in every pixel region.

SUMMARY

In consideration of these circumstances, an electro-optical device of the present invention comprises: an electro-optical material; and a plurality of pixel regions separately controlling optical states of the electro-optical material, and each pixel region having a light transmitting portion and a light reflecting portion; wherein, at adjacent pixel regions that are arranged in a predetermined direction, end edges of each of the light transmitting portions orthogonal to the predetermined arrangement direction are aligned with each other.

According to the present invention, in the adjacent pixel regions in the predetermined arrangement direction, the end edges of each of the light transmitting portions orthogonal to the predetermined arrangement direction are aligned with each other. Accordingly, an unevenness of an outer edge extending to the predetermined arrangement direction of a display format can be difficult to view in any one of a transmissive display and a reflective display, thereby alleviating the blurring of the display contours and obtaining more clear display aspects.

In the present invention, it is preferable that, at the adjacent pixel regions in the predetermined arrangement direction, pairs of end edges located at both ends of each of the light transmitting portions orthogonal to the predetermined arrangement direction are aligned with each other. In this case, since the pairs of end edges located at both ends of each of the light transmitting portions are aligned with each other, the unevenness of the outer edge extending in the predetermined arrangement direction can be made difficult to view, thereby further reducing the blurring of the display contours.

In the present invention, it is preferable that at the adjacent pixel regions in the predetermined arrangement direction, the areas of the light transmitting portions are different from each other. Normally, there is a case that the areas of the light transmitting portions may be different from each other so as to suitably set the display conditions between the adjacent pixel regions. In this case, a direction in which the pixel regions comprising the light transmitting portions having areas different from each other are adjacently arranged becomes the predetermined arrangement direction, so that the unevenness of the outer edge of the display format can be alleviated. Accordingly, the blurring of the display contours may be even more greatly reduced.

In the present invention, it is preferable that, at the adjacent pixel regions in the predetermined arrangement direction, widths of the light transmitting portions, which are measured in the predetermined arrangement direction, are different from each other. The widths of the light transmitting portions are different from each other, so that the areas of the light transmitting portions can be freely increased or decreased without changing the end edge position. Accordingly, a structure design of a plane pattern may be easily performed.

In the present invention, it is preferable that a colored layer of a plurality of color tones have a color filter arranged in a predetermined pattern in every pixel region, and the predetermined arrangement direction is a direction that the pixel regions at which the colored layer of different color tones is disposed are adjacent to each other. According to the present invention, even though the areas of the light transmitting portions between the adjacent pixel regions are increased or decreased to obtain a balance of color display using the colored layers of different color tones, the blurring of the display contours can be reduced because the end edge positions of the light transmitting portions are aligned with each other.

In the present invention, it is preferable that a plane shape of the pixel region is rectangular, and the predetermined arrangement direction is a direction that a shorter side of the pixel region extends. When the plane shape of the pixel region is rectangular, the degree of freedom for the end edge position of the light transmitting portion in a direction along the longer side of the pixel region is large. As a result, when the end edge positions of the light transmitting portions of the corresponding direction slip, the blurring of the display contours along the direction in which the shorter side of the pixel region extends is easy visible. For this reason, in the present invention, the end edge positions of the light transmitting portions between the adjacent pixel regions in an extending direction of the corresponding shorter side are aligned with each other, thereby effectively reducing the blurring of the display contours.

In the present invention, it is preferable that a plurality of the light transmitting portions be provided in the pixel region. When a single light transmitting portion exists in the pixel region, a slippage of the end edge positions of the light transmitting portions is likely to become visible. In comparison, when the plurality of the light transmitting portions is arranged in the pixel region, a forming density of the light transmitting portions is larger than the density of the pixel, thereby reducing the blurring of the display contours. For example, even though the end edge positions of the light transmitting portions between the adjacent pixel regions in the predetermined arrangement direction are aligned with each other, as in the present invention, a gap exists between the light transmitting portions of the adjacent pixel regions. Accordingly, strictly speaking, it is impossible to prevent the outer edge along the predetermined arrangement direction of the display format from being visible in an uneven shape. However, the plurality of light transmitting portions is arranged in one pixel region and thus the period of the unevenness or the depth of the unevenness can be small, thereby reducing the blurring of the display contours.

Further, when the plurality of light transmitting portions is provided in at least one of the pixel regions, an end edge position disposed at the most peripheral edge side orthogonal to the predetermined arrangement direction serves as the end edge position. When the plurality of aperture portions is provided in one pixel region, a plurality of light transmitting portions is respectively constituted by the plurality of aperture portions, so that an end edge exists in each light transmitting portion. In this case, however, since end edge positions disposed at the most peripheral edge side actually determines the outer edge of the display format, the light transmitting portions constituted in one pixel region may be regarded as one body. Accordingly, it is advantageous that the end edge positions arranged at the most peripheral edge are set to be aligned with each other between the adjacent pixel regions.

An electronic apparatus of the present invention comprises an electro-optical device according to the present invention and control means for controlling the electro-optical device. The electro-optical device according to the present invention can reduce the blurring of the display contours as described above, and implement transmissive display and reflective display even when the display screen is relatively small or when the number of pixels is relatively small. Accordingly, the invention is particularly advantageous for a portable electronic apparatus.

DETAILED DESCRIPTION

Hereinafter, embodiments of the present invention will be described in detail with reference to the accompanying drawings. Moreover, each drawing attached to the present specification does not express actual component shapes and is drawn by suitably deforming the dimensions of the shapes for the convenience of illustration. For example, a thickness of each layer in a panel structure of the electro-optical device may be expressed more exaggeratedly than the actual dimensions in many cases.

First Embodiment

Figure 1:
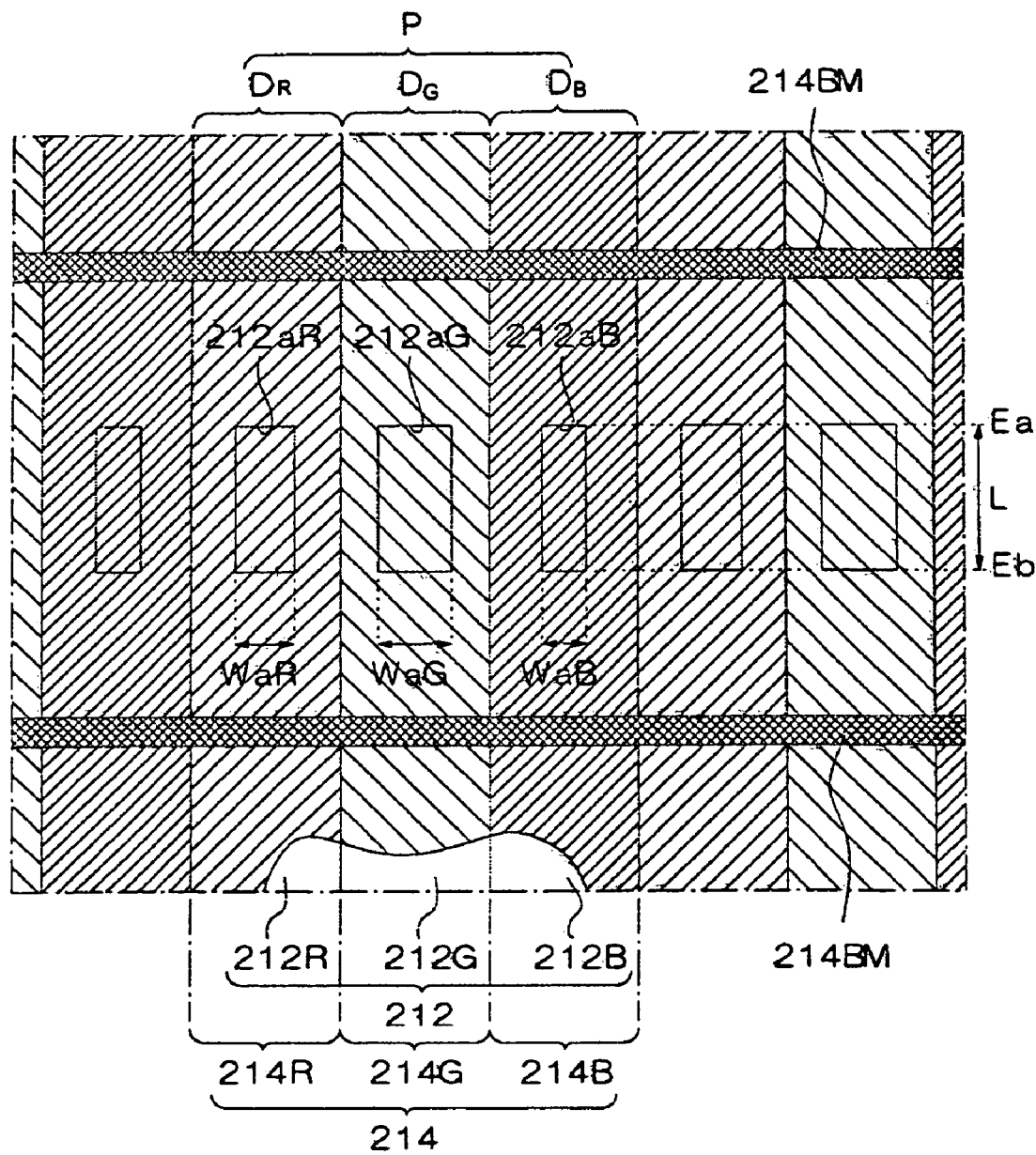
FIG. 1 is an expanded partial plan view of a first embodiment.

FIG. 1 is an expanded partial plan view expansively showing a structure of the pixel regions of an electro-optical device according to the first embodiment of the present invention. In the drawing, each pixel region $D_R$, $D_G$ and $D_B$ is directly arranged with no gap provided between the regions in a diagrammatically horizontal direction and with a light shielding layer 214BM in a diagrammatically vertical direction. It should be noted that this arrangement is an example of the arrangement pattern, and thus the pixel regions may be arranged in horizontal and vertical directions with a gap (or a light shielding region), like the example of a structure of a liquid crystal display device described below.

In the present embodiment, the adjacent three pixel regions $D_R$, $D_G$ and $D_B$ are provided with a red (R) colored layer 214R, a green (G) colored layer 214G and a blue (B) colored layer 214B of a color filter 214, respectively. The pixel region is a minimum unit of a region wherein an optical state is separately controllable, and the adjacent three pixel regions $D_R$, $D_G$ and $D_B$ form one pixel P. The pixel P constitutes a minimum unit of a color element forming a color image. On a rear side of the color filter 214 (a side opposite to an observation side), a reflective layer 212 is formed, and the reflective layer 212 comprises reflective surfaces 212R, 212G and 212B respectively positioned at the pixel regions $D_R$, $D_G$ and $D_B$. On the reflective layer 212, aperture portions 212aR, 212aG and 212aB are formed in the pixel regions $D_R$, $D_G$ and $D_B$, respectively. Each of the aperture portions 212aR, 212aG and 212aB constitutes a light transmitting portion in each pixel region, and a forming range of the reflective layer 212 (i.e., the remainder of the reflective layer 212) other than the aperture portion constitutes a light reflecting portion in each pixel region.

In the present embodiment, between the pixel regions $D_R$ and $D_G$, $D_G$ and $D_B$, and $D_B$ and $D_R$ adjacent in a diagrammatically horizontal direction, that is, a direction in which colored layers with different color tones in the color filter 214 are adjacent or a direction in which a shorter side of the planar rectangular pixel region extends (hereinafter, simply referred as "a first direction"), end edge positions Ea in a direction (hereinafter, simply referred as "a second direction") perpendicularly crossing the first direction of the aperture portion are aligned with each other. Further, end edge positions Eb opposite to the end edge positions Ea are also aligned with each other. For this reason, when viewed from the second direction, all lengths L of the aperture portions 212aR, 212aG and 212aB are configured to be the same.

In the present embodiment, the pixel regions $D_R$, $D_G$ and $D_B$ have a rectangular plane shape with a shorter side extending in the first direction and a longer side extending in the second direction. Further, each of the aperture portions 212aR, 212aG and 212aB has a rectangular plane shape having a shorter side extending in the first direction and a longer side extending in the second direction. A length of any one of the aperture portions 212aR, 212aG and 212aB is the length L.

On the other hand, the optical property of each colored layer 214R, 214G and 214B is substantially determined by a filter material and the optical property of the entire color filter 214 depends on a combination of the filter materials. However, adjustments of the optical property of the filter material (for example, a colored material such as a pigment or a dye is distributed in a resin substrate material), that is, color tones or luminosity, are very difficult, and a color display is minutely changed due to a balance of colors between the pixels. For these reasons, instead of adjusting the filter material or in combination with adjusting the filter material, an area ratio of the light transmitting portion and the light reflecting portion in each pixel region, that is, an aperture ratio of the light transmitting portion is adjusted. By doing so, a color balance of the transmissive display and the reflective display can be relatively easily set.

As described above, if the aperture ratio of the light transmitting portion is adjusted, at least two of the three pixel regions $D_R$, $D_G$ and $D_B$, generally have aperture portions with different aperture areas. Of course, it is advantageous in that all of the three pixel regions $D_R$, $D_G$ and $D_B$ have aperture portions with different aperture areas. As described above, when the end edge positions Ea and Eb of the aperture portions 212aR, 212aG and 212aB are aligned with each other between the adjacent pixel regions in the first direction, the widths (that is, the length of the shorter side of the rectangular type regions) WaR, WaG and WaB measured in the first direction may be changed from each other, thereby changing the relative aperture areas.

Moreover, in the present embodiment, the colored layers, all of which have the same color tones, are formed between the pixel regions arranged in the second direction (diagrammatically vertical direction), and the aperture portions are configured to have the same shape, the same area and the same forming position in the pixel region as each other.

In the present embodiment, between the pixel regions arranged along the first direction as described above, the end edge positions Ea and Eb of the second direction of each light transmitting portion are aligned with each other, so that an outer edge along the first direction of the display format of the transmissive display and the reflective display forms a straight line, and the blurring of the display contours is alleviated. In particular, between the pixel regions adjacent in the shorter side direction (the first direction) of the pixel region, there is significant room for the end edge positions of the light transmitting portion in the longer side direction (the second direction) of the pixel region to deviate from each other, so that any unevenness of the outer edge having the display format along the first direction tends to be large, and the unevenness is likely to become visible, whereby the influence on the blurring of the display contours becomes larger. Accordingly, in the present embodiment, the end edge positions of the light transmitting portions adjacent in the first direction are arranged uniformly, so that the blurring of the display contours can be effectively reduced.

In the present embodiment, it is preferable that the lengths L in the second direction of the aperture portions 212aR, 212aG and 212aB be in a range of 30% to 50% of the length in the second direction of the pixel regions $D_R$, $D_G$ and $D_B$, and more specifically in a range of ⅓ to ½. If the length L exceeds the above-mentioned range, the luminosity of the reflective display cannot be ensured. Further, if the length L is below the above-mentioned range, a difference of a line width extending along the first direction of the transmissive display and a line width of the reflective display becomes large, and thus a difference of the display aspects is not easily ignored. In particular, it is most preferable that the length L be ⅓ of the length in the second direction of the pixel region, similar to the example shown in the drawing.

Second Embodiment

Figure 2:
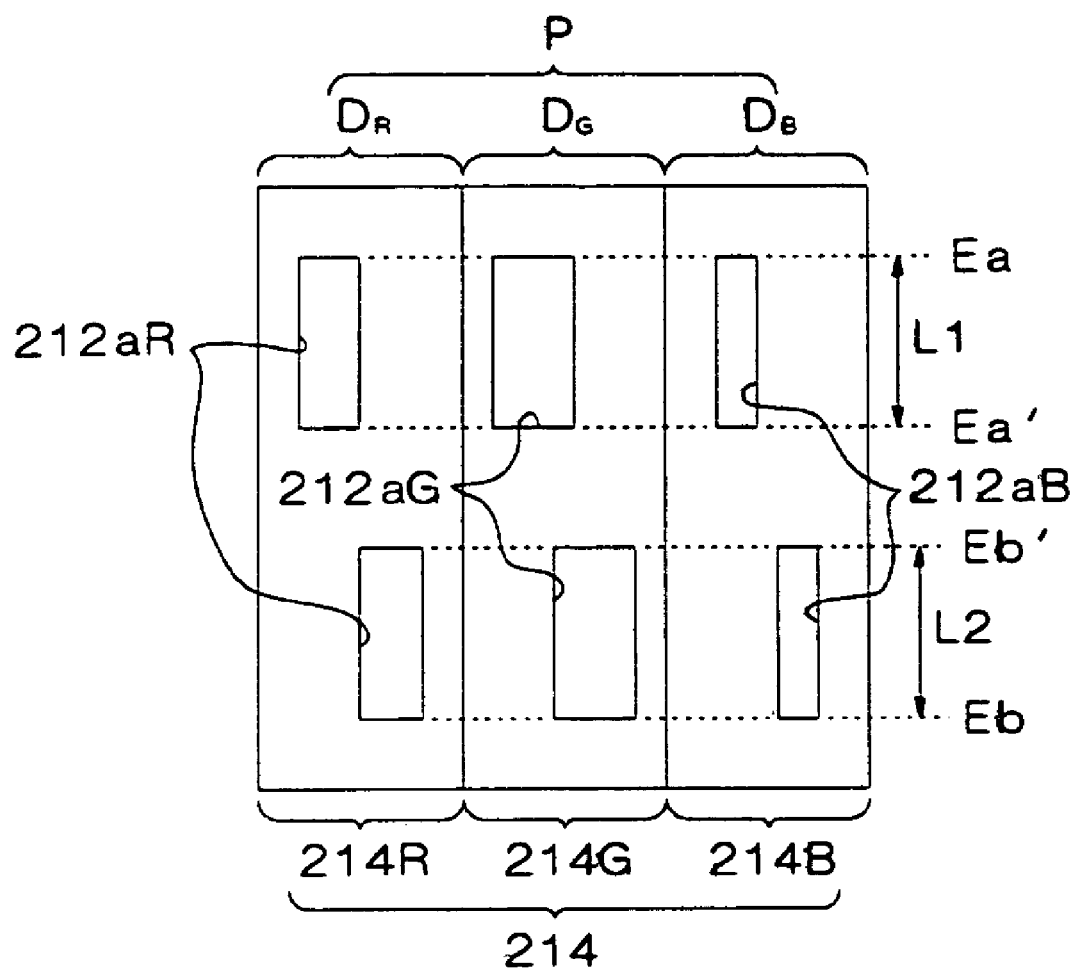
FIG. 2 is an expanded partial plan view of a second embodiment.

A second embodiment according to the present invention will be described with reference to FIG. 2. FIG. 2 is an expanded partial plan view showing a plane structure in one pixel P of the second embodiment. In the present embodiment, a plane shape or an arrangement aspect of the pixel regions $D_R$, $D_G$ and $D_B$ is the same as the first embodiment, and further the second embodiment is the same as the first embodiment in that the aperture areas of the aperture portions 212aR, 212aG and 212aB are different from each other and the plan view shape of the aperture portions is rectangular. However, a plurality of aperture portions 212aR, 212aG and 212aB are formed in the pixel regions $D_R$, $D_G$ and $D_B$, respectively.

In the example shown in the drawing, two aperture portions are formed in each pixel region. The aperture portions in each pixel region are arranged at positions which deviate (are offset) from each other in the first and second directions. Further, both aperture portions in each pixel region are configured to have the same area and shape as each other.

In the present embodiment, the end edge positions Ea on one outermost side (diagrammatically upper side) of the second direction, that is, the end edge positions Ea of one side of the aperture portion formed in one side (diagrammatically upper side) of the second direction are aligned with each other between the pixel regions adjacent in the first direction. Further, the end edge positions Eb on the other outermost side (diagrammatically lower side) of the second direction, that is, the end edge positions Eb of the other side of the aperture portion formed in the other side (diagrammatically lower side) of the second direction are aligned with each other between the pixel regions adjacent in the first direction. In the present embodiment, when a plurality of the light transmitting portions in the pixel region is viewed as a single body, all of the end edge positions Ea of one side and the end edge positions Eb of the second direction of the light transmitting portions are aligned with each other, respectively, like the first embodiment. Also, the areas of the light transmitting portions between at least one group of the pixel regions adjacent in the first direction are different from each other.

Further, in the present embodiment, end edge positions Ea' and Eb' disposed at a central region of the second direction of the aperture portions formed by two portions per pixel region are also aligned with each other between the pixel regions adjacent in the first direction. However, since the positions of the end edge positions Ea' and Eb' do not constitute the outer edge of the display format, the alignment of the end edge positions Ea' and Eb' is less important than that of the end edge positions Ea and Eb for reducing the blurring of the display contours. Accordingly, it is possible for the end edge positions Ea' and Eb' to not align with each other between the adjacent pixel regions in the first direction.

The present embodiment has advantages similar to that described in the first embodiment. Further, by providing a plurality of light transmitting portions in one pixel region, the present embodiment can obtain a more minute display than that of the first embodiment, and can further reduce the blurring of the display contours. In the present embodiment, it is preferable that the sum of the lengths measured in the second direction of the plurality of the aperture portions (L=L1+L2) be in a range of 30 to 50% of the length of the pixel regions in the second direction, which is similar to the first embodiment.

Third Embodiment

Figure 3:
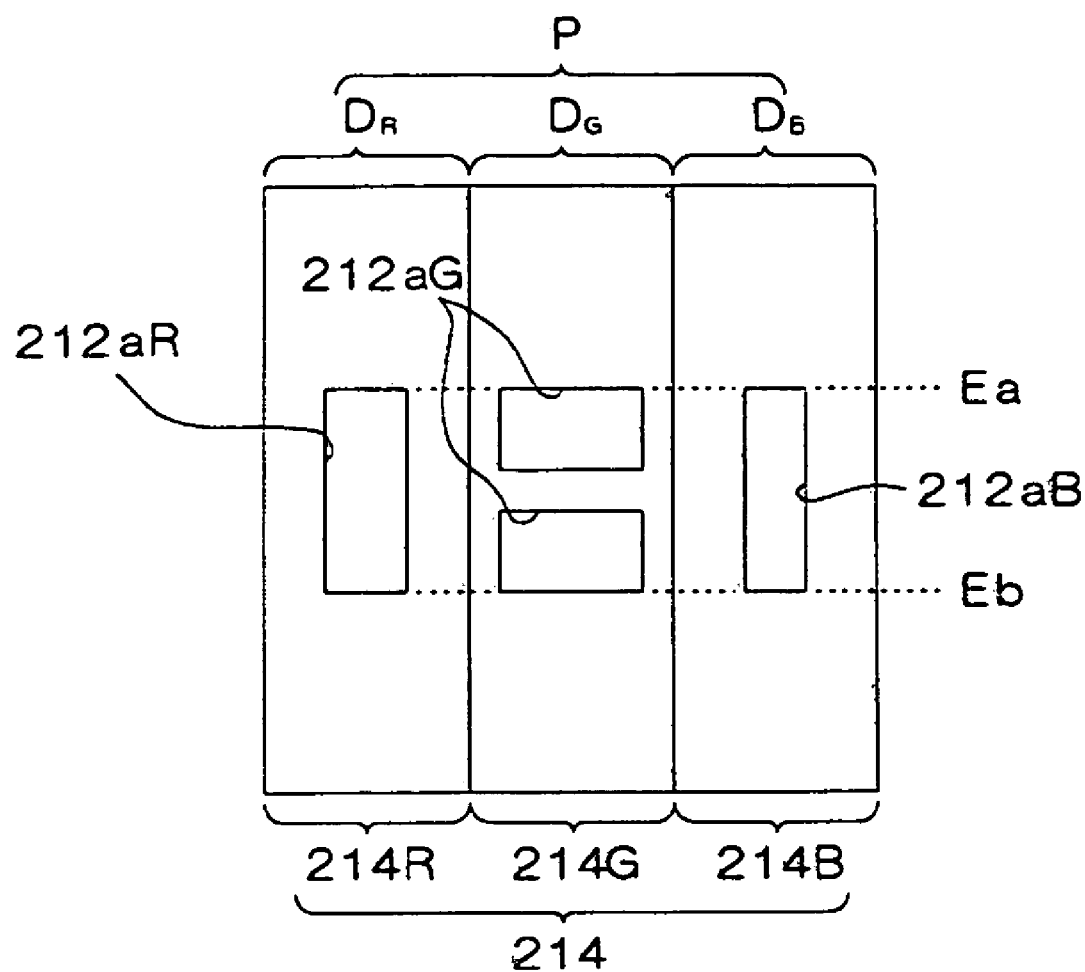
FIG. 3 is an expanded partial plan view of a third embodiment.

A third embodiment according to the present invention will be described in detail with reference to FIG. 3. In the present embodiment, the pixel regions $D_R$ and $D_B$ have a single aperture portion 212aR and 212aB, respectively, but the pixel region $D_G$ has a plurality of aperture portions 212aG. Though the number of aperture portions formed between the pixel regions adjacent in the first direction are different from each other in this embodiment, when viewing the aperture portions as a group, end edge positions Ea disposed at one outermost side (an upper side) in the second direction align with each other between the pixel regions adjacent in the-first direction. Further, end edge positions Eb disposed at the other outermost side (diagrammatically lower side) in the second direction align with each other between the pixel regions adjacent in the first direction.

In the present embodiment, similarly to the second embodiment, the pixel region $D_G$ having the plurality of aperture portions 212aG uses an end edge position disposed at one outermost side (diagrammatically upper side, that is, an upper peripheral edge side of the pixel region $D_G$) among end edge positions of one side (diagrammatically upper side), which exist in plural due to the plurality of aperture portions, and uses an end edge position disposed at the other outermost side (diagrammatically lower side, that is, a lower peripheral edge side of the pixel region $D_G$) among end edge positions of the other side (diagrammatically lower side), which exist in plural due to the plurality of aperture portions, as an end edge position aligned with the end edge positions of the aperture portions of the adjacent other pixel regions $D_R$ and $D_B$. In this way, similarly to the first and second embodiments, the present embodiment can reduce the blurring of the display contours.

Fourth Embodiment

Figure 4:
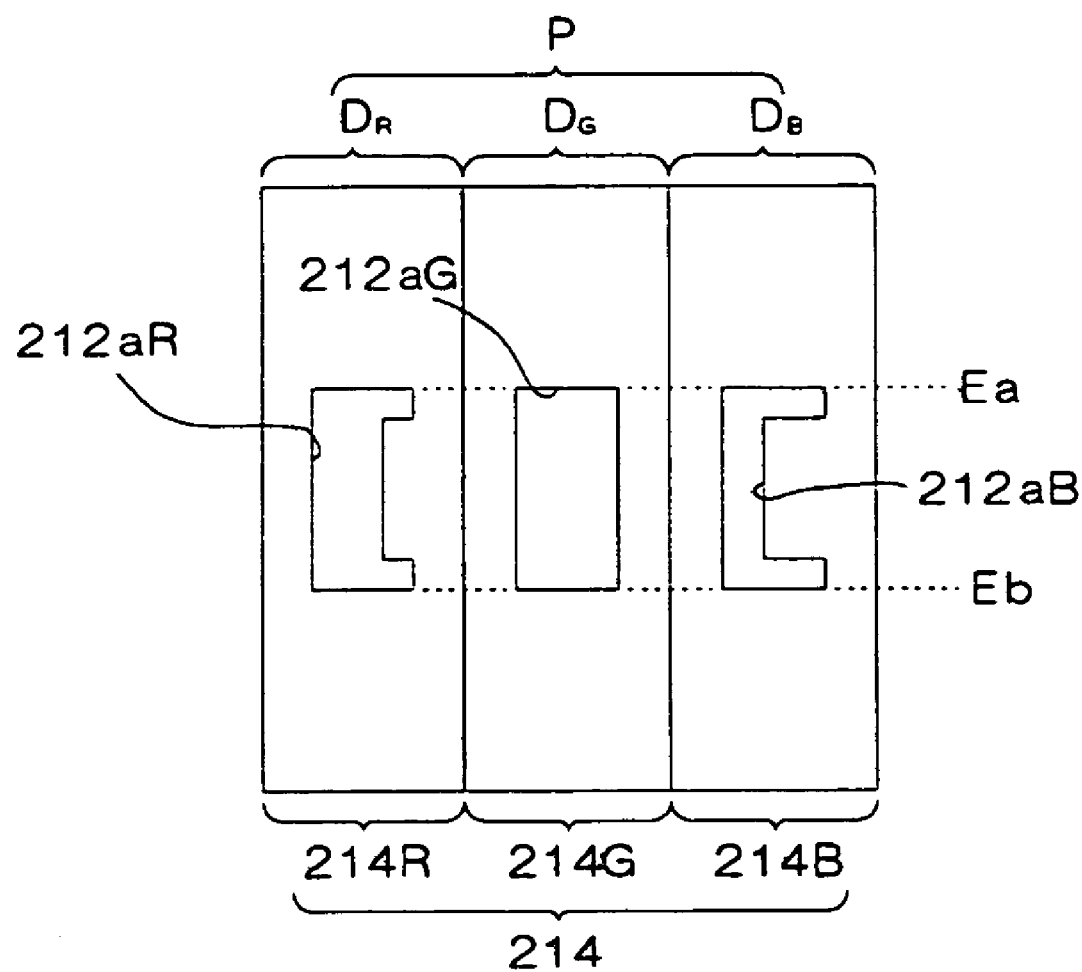
FIG. 4 is an expanded partial plan view of a fourth embodiment.

A fourth embodiment according to the present invention will be described in detail with reference to FIG. 4. The present embodiment is the same as each previous embodiment in that the areas of the aperture portions 212aR, 212aG and 212aB are different from each other between the pixel regions adjacent in the first direction. However, in the previous embodiments, only the widths of the aperture portions (the lengths in the first direction) were changed from each other. In the present embodiment, the shapes of the aperture portions are varied, so that the areas of the aperture portions are different from each other. Even if configured this way, there is no change in that the end edge positions Ea and Eb between the pixel regions adjacent in the first direction align with each other. Accordingly, the present embodiment is capable of obtaining a similar effect to the previous embodiments.

In the present embodiment, the shapes near the end edge positions Ea and Eb aligned with each other between the pixel regions adjacent in the first direction are the same, while the shapes of the portions away from the end edge positions Ea and Eb are different from each other. More specifically, in the end edge positions Ea and Eb of the aperture portions, widths measured in the first direction are the same between each pixel region. If done this way, the end edge positions, which constitute the outer edge of the display format along the first direction, are equal to each other between the adjacent pixel regions, thereby further reducing the blurring of the display contours.

Fifth Embodiment

Figure 5:
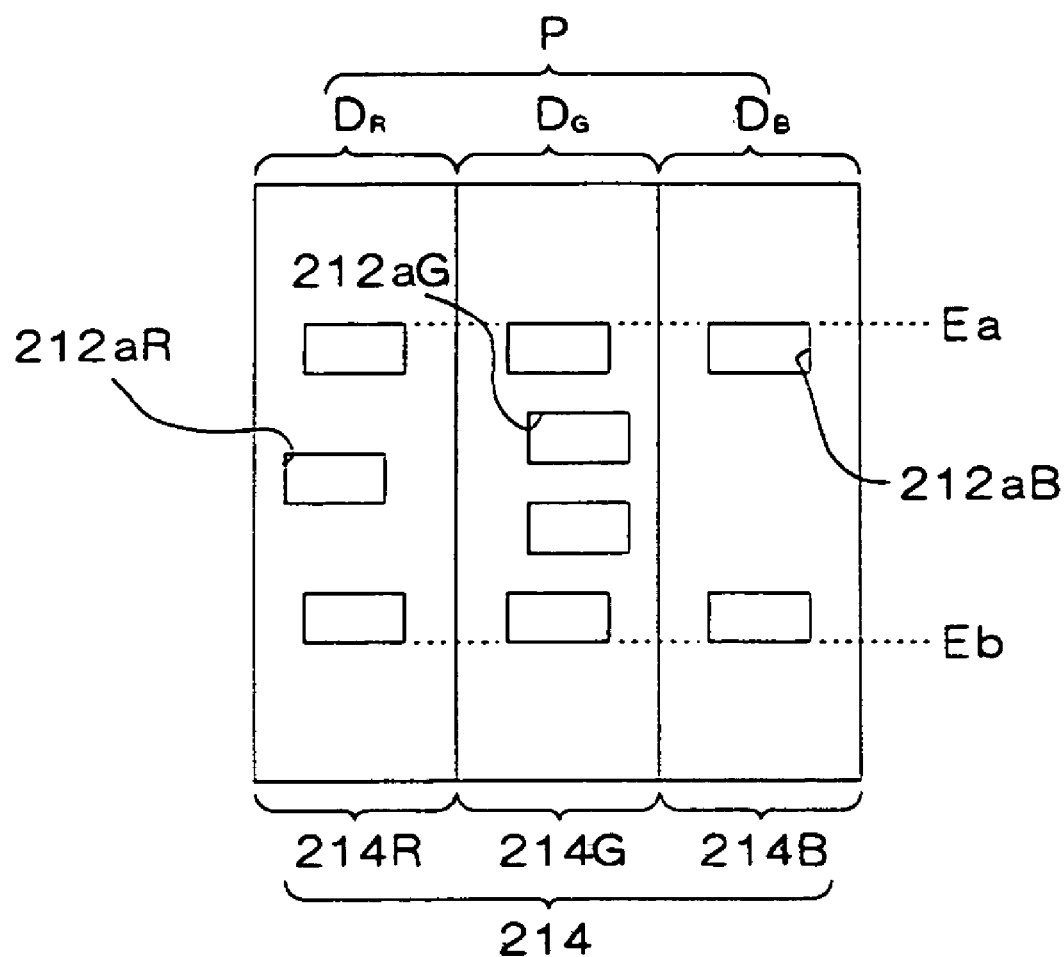
FIG. 5 is an expanded partial plan view of a fifth embodiment.
Figure 6A:
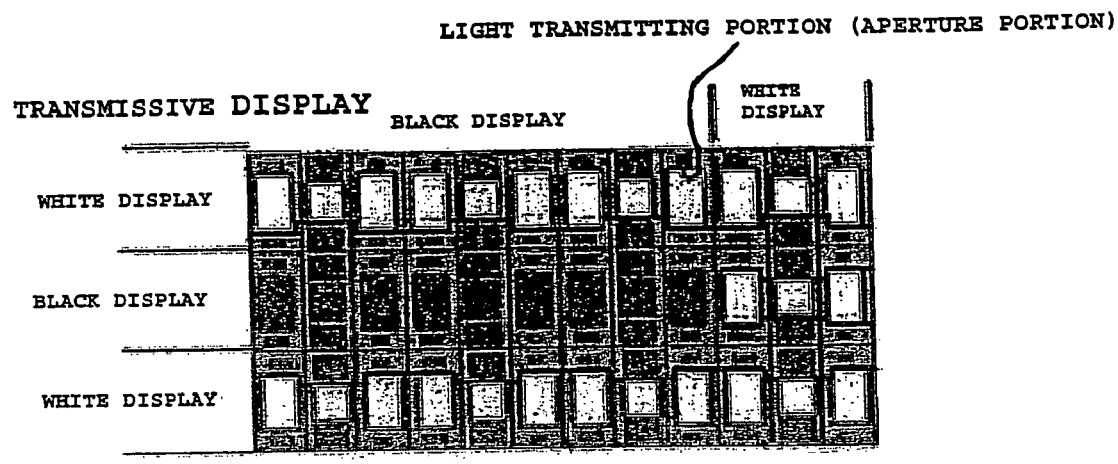
FIG. 6(a) is an expanded partial plan view of a transmissive display and FIG. 6(b) is an expanded partial plan view of a reflective display illustrating a conventional structure.
Figure 6B:
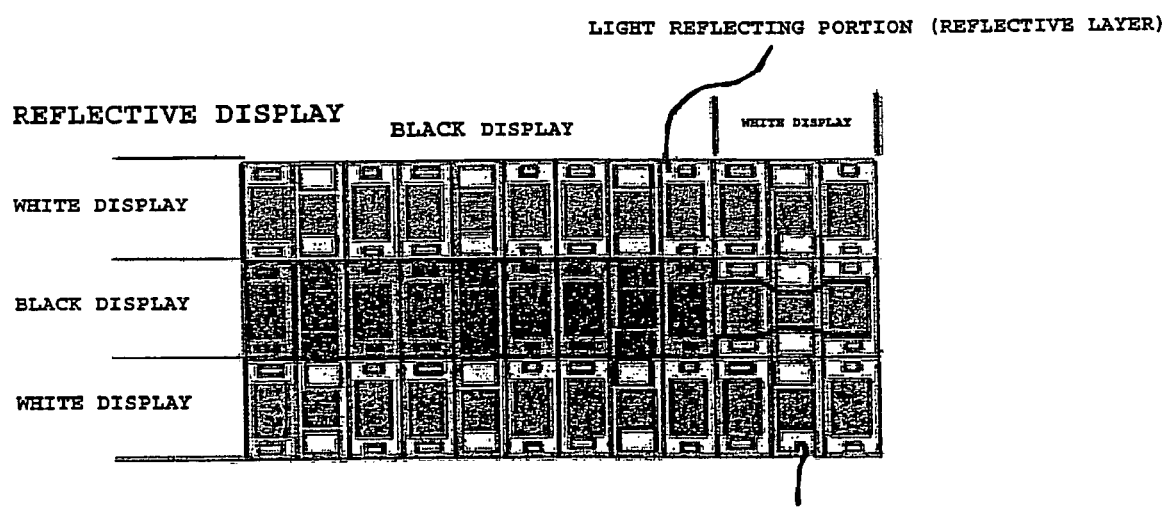

A fifth embodiment according to the present invention will be described in detail with reference to FIG. 5. The present embodiment is similar to the second embodiment in that a plurality of aperture portions 212aR, 212aG and 212aB are formed in each pixel region $D_R$, $D_G$, and $D_B$, but is different from the second embodiment in that the number of aperture portions increases in accordance with the area of the aperture portion desired in each pixel region. In the example shown in the drawing, aperture portions having the same area and the same shape are formed in each pixel region, respectively, and the number of aperture portions in each pixel region is different from each other.

The present embodiment is different from the previous embodiments in that the plurality of aperture portions is arranged in the second direction in each pixel region. The end edge positions Ea and Eb in the second direction disposed at a most peripheral edge side (one side or the other side, that is, the diagrammatically upper side or the diagrammatically lower side) are configured to be aligned with each other between the pixel regions adjacent in the first direction.

Further, in the present embodiment, between the pixel regions adjacent in the first direction, at least one of the plurality of aperture portions is arranged to be slightly offset or slipped in the first direction. More specifically, at least one of the aperture portions provided in the pixel regions $D_R$ and $D_G$ (having a large aperture area) is arranged to be shifted toward a side of the pixel region $D_B$ having a small aperture area. By doing so, when viewed from the first direction as a whole, a shift of an aperture distribution can be reduced, and a uniformity of the display format can be enhanced. Herein, in each pixel region, the aperture portions having the end edge positions Ea and Eb in the second direction side are arranged in a central portion of each pixel region, without being shifted in the first direction. By doing so, the blurring of the display contours of the outer edge of the display format along the first direction can be further reduced, and thus the display format can be expressed more clearly.

Structure of Electro-optical Device

Figure 7:
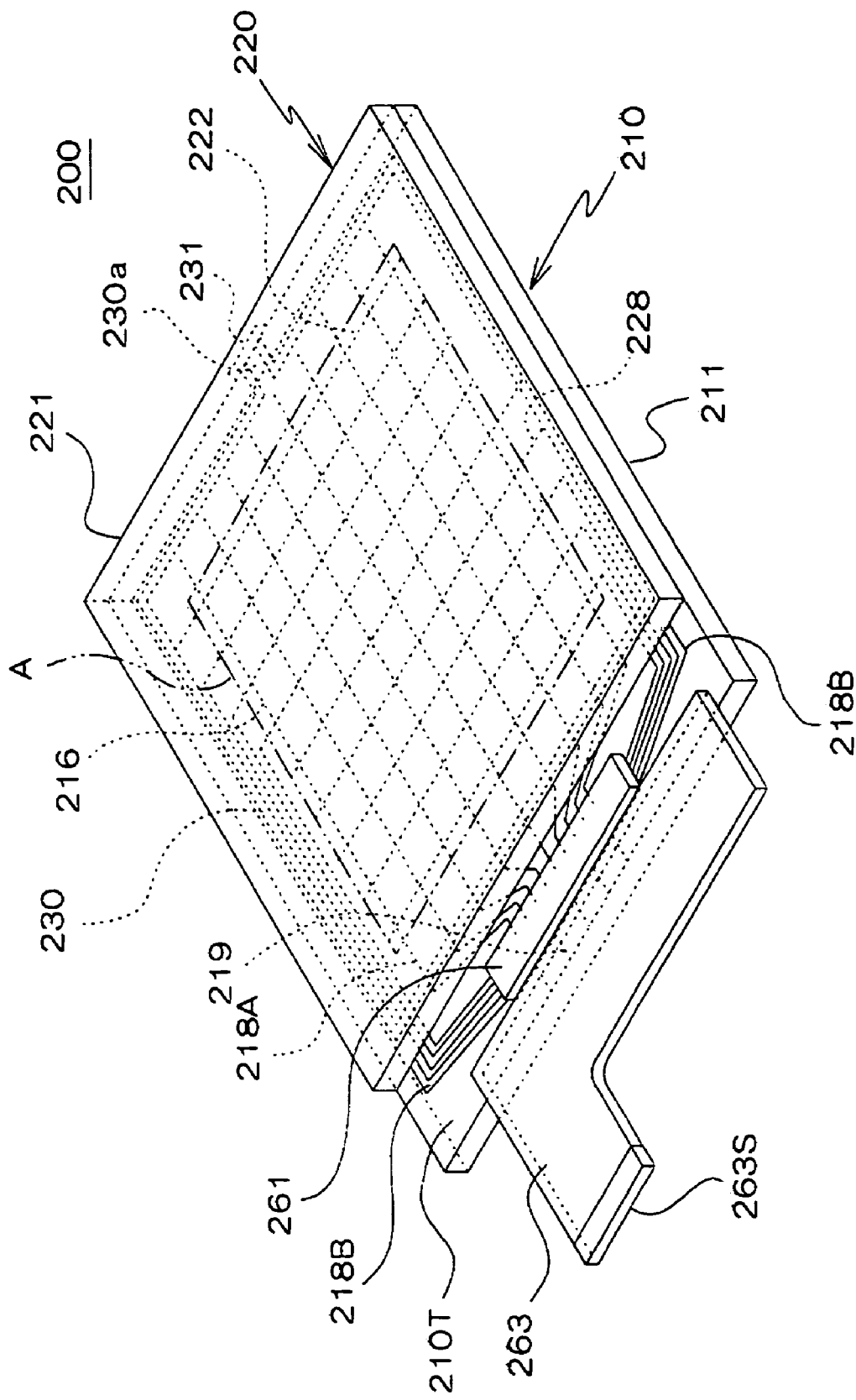
FIG. 7 is a schematic perspective view of an electro-optical device.
Figure 8A:
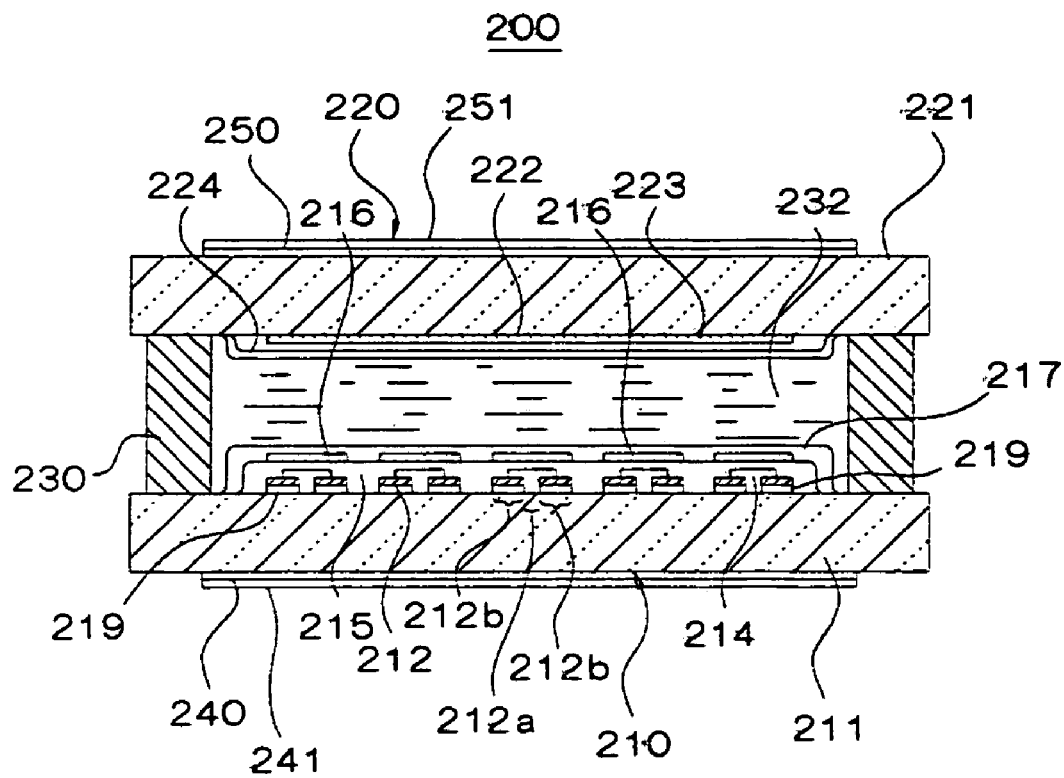
FIG. 8(a) is a schematic cross-sectional view of the electro-optical device and FIG. 8(b) is an expanded partial plan view illustrating a structure on one side of a substrate.
Figure 8B:
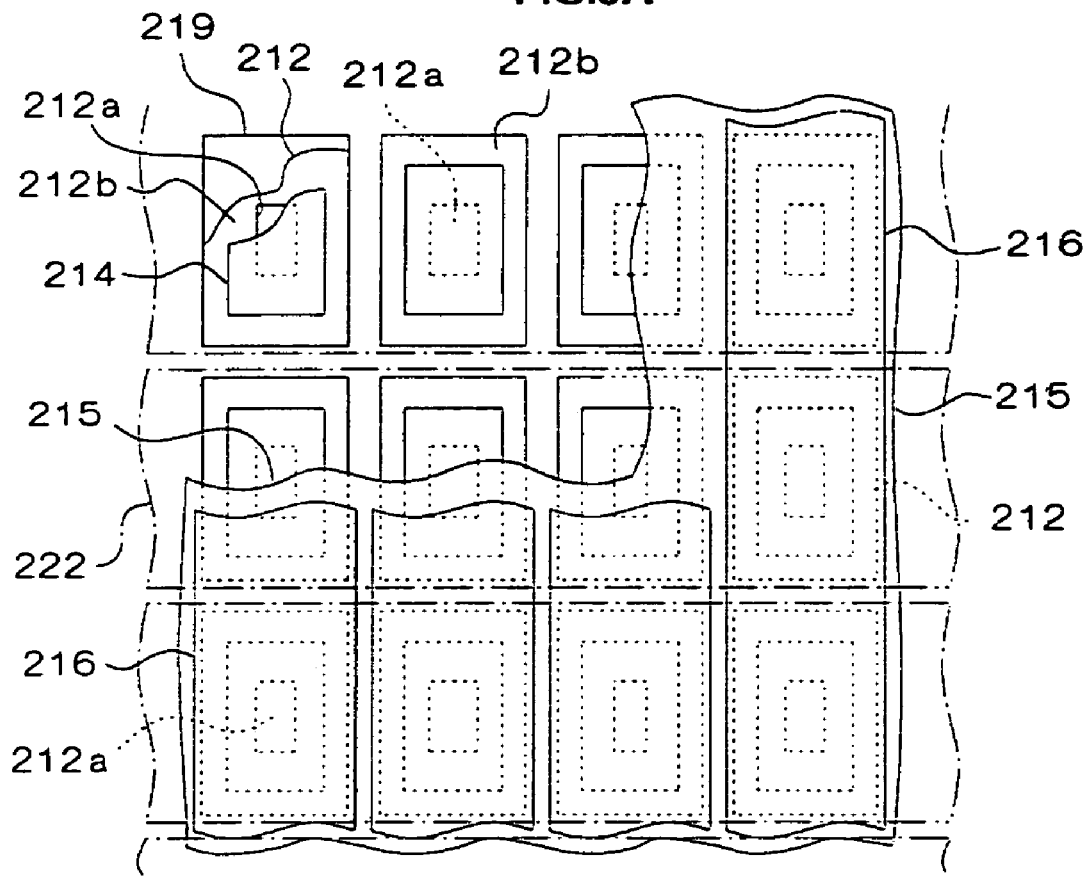

A liquid crystal display device 200, which is an example of an electro-optical device to which each of the above-mentioned embodiments can be applied, will be described with reference to FIGS. 7 and 8. FIG. 7 is a schematic perspective view showing an exterior of the liquid crystal display device 200 according to the present invention. FIG. 8(a) is a schematic cross-sectional view of the liquid crystal display device 200, and FIG. 8(b) is an expanded partial plan view of a first substrate 210 which constitutes the liquid crystal display device 200.

As shown in FIG. 7, the liquid crystal display device 200 has a cell structure constituted by attaching the first substrate 210 which use as a base substrate a transparent substrate 211 composed of a glass plate, a synthetic resin plate and the like and a second substrate 220, opposite to the first substrate, which use as a base substrate the similar substrate 221 via a sealing material 230, inserting liquid crystal 232 from an insertion slot 230a into an inner side of the sealing material 230, and then sealing it with a sealing material 231.

On an inner surface (a surface opposite to the substrate 221) of the substrate 211, a plurality of parallel transparent electrodes 216 are formed in a stripe shape using a sputtering method, and on an inner surface of the substrate 221, a plurality of parallel transparent electrodes 222 are formed in a stripe shape using the same method. Further, the transparent electrodes 216 are electrically connected to wires 218A, and the transparent electrodes 222 are electrically connected to wires 228. The transparent electrodes 216 and the transparent electrodes 222 are orthogonal to each other, their intersections constitute a plurality of pixel regions arranged in a matrix, and these pixel regions constitute a liquid crystal display region A.

The substrate 211 has a substrate protruding portion 210T protruding outside than an external shape of the substrate 221, and on the substrate protruding portion 210T, wires 218B electrically connected to the wires 218A and the wires 228 via an upper and lower electrical conduction portions, which comprises a portion of the sealing material 230, and an input terminal portion 219 formed separately and made of a plurality of wire patterns are formed. Further, on the substrate protruding portion 210T, a semiconductor IC 261 having built-in liquid crystal driving circuits is mounted so as to be electrically connected to the wires 218A and 218B and the input terminal portion 219. Further, on an end portion of the substrate protruding portion 210T, a wiring board 263 comprising a flexible wiring board (FPC) and the like is mounted so as to be electrically connected to the input terminal portion 219.

In the liquid crystal display device 200, as shown in FIG. 8, a phase difference plate (¼ wavelength plate) 240 and a polarizer 241 are arranged on an outer surface of the substrate 211, and a phase difference plate (¼ wavelength plate) 250 and a polarizer 251 are arranged on an outer surface of the substrate 221.

With reference to FIGS. 8(a) and (b), a detailed structure of the first substrate 210 and the second substrate 220 will be described. In the first substrate 210, transparent base layers 219 are formed on a surface of the substrate 211. Further, reflective layers 212 are formed on the base layers 219, and an aperture portion (a light transmitting portion) 212a (which corresponds to the above-mentioned aperture portions 212aR, 212aG and 212aB) is provided in each pixel region. Among the reflective layers 212, the aperture portions 212a constitute the light transmitting portions, and portions other than the aperture portions 212a are light reflecting portions 212b for substantially reflecting light. In the present embodiment, the aperture portion 212a and the light reflective layer 212b are formed in each pixel region. It is reasonably advantageous in that the reflective layer 212 is formed on the entire liquid crystal display region A as one body, and only the aperture portion 212a is formed in every pixel.

The base layer 219 and the reflective layer 212 are a structure for constituting a reflective surface of a light scattering property by having a minute unevenness formed on a surface of the reflective layer 212. Herein, a minute surface unevenness shape is formed on the surface of the base layer 219 using a photolithography method and the like, and a reflective layer 212 is formed thereon, so that the reflective surface of a light scattering property reflecting the surface of the base layer 219 is formed.

On the reflective layer 212, colored layers 214 are formed, and a surface protecting layer (an overcoat layer) 215 made of a transparent resin is further formed thereon. The colored layers 214 and the surface protecting layer 215 constitute a color filter.

In general, the colored layer 214 shows predetermined color tones by distributing a colored material such as a pigment or a dye into a transparent resin. An example of color tones of the colored layer includes a combined color tone of three colors of primary color based R (red), G (green) and B (blue), but is not limited to this color tone. The color tone may include any other various color tones such as complementary color based color tones. Normally, by coating colored resist made of a photosensitive resin containing a colored material such as a pigment or a dye on the surface of the substrate and removing unnecessary portions using the photolithography method, the colored layer having a predetermined color pattern is formed. Herein, in case of forming the colored layer of a plurality of color tones, the process is repeated.

Moreover, as the arrangement pattern of the colored layers, a stripe arrangement is adopted in an example shown in FIG. 8(b), but other than this stripe arrangement pattern, various pattern shapes of a delta arrangement, a oblique mosaic arrangement and the like is adoptable. Further, in a periphery of each colored layer of RGB, a light shielding layer (black matrix or black mask) of a portion of the colored layer may be formed for performing the light shielding of a region between the pixels.

On the surface protecting layer 215, transparent electrodes 216 composed of a transparent electric conductor, such as ITO (Indium Tin Oxide), are formed using sputtering method and the like. The transparent electrode 216 is formed in a band shape extending in a diagrammatically vertical direction of FIG. 8(b), and a plurality of transparent electrodes 216 are formed in a strip shape parallel to each other. On the transparent electrode 216, an alignment film 217 made of a polyimide resin and the like is formed.

In the present embodiment, as shown in FIG. 8(b), the colored layer 214 constituting the color filter overlaps in a planar type so as to entirely cover the aperture portion 212a of the reflective layer 212 in each pixel, and is formed as one body so as to protrude onto the reflection portion 212b of the periphery of the aperture portion 212a from the region overlapping in a planar type the aperture portion 212a toward the periphery.

Further, the colored layer 214 is formed not in the entire portion of each pixel, but to overlap only a portion of the reflective layer 212. That is, the reflective layer 212 has a region overlapping in a planar type the colored layer 214 (an inner periphery region facing the aperture portion 212a in an example shown in the drawing) and a region not overlapping in a planar type the colored layer 214 (an outer periphery region in the example shown in the drawing).

Moreover, in the present embodiment, an aspect forming the colored layer 214 is not limited to the above-mentioned aspect. For example, the colored layer 214 may be formed on an entire surface of the pixel region. Further, as described below, a portion on the surface of the reflective layer 212 and a portion on the aperture portion 212a may be made of a separate filter material.

On the other hand, in the liquid crystal display device 200, the second substrate 220 opposite to the first substrate 210 has transparent electrodes 222 similar to the above-mentioned electrodes and formed on the substrate 221 made of a glass and the like, and a hardened protective film 223 made of $SiO_2$ or $TiO_2$ is formed thereon. Further, an orientation film 224 similar to the above-mentioned film is formed thereon.

Moreover, in the present embodiment, the liquid crystal display device (liquid crystal display panel) is made using the first substrate 210 comprising the reflective layer and the color filter. However, it is possible that one of the first and second substrates is used as a reflective substrate having a reflective layer and the other substrate is used as a color filter substrate.

Figure 9A:
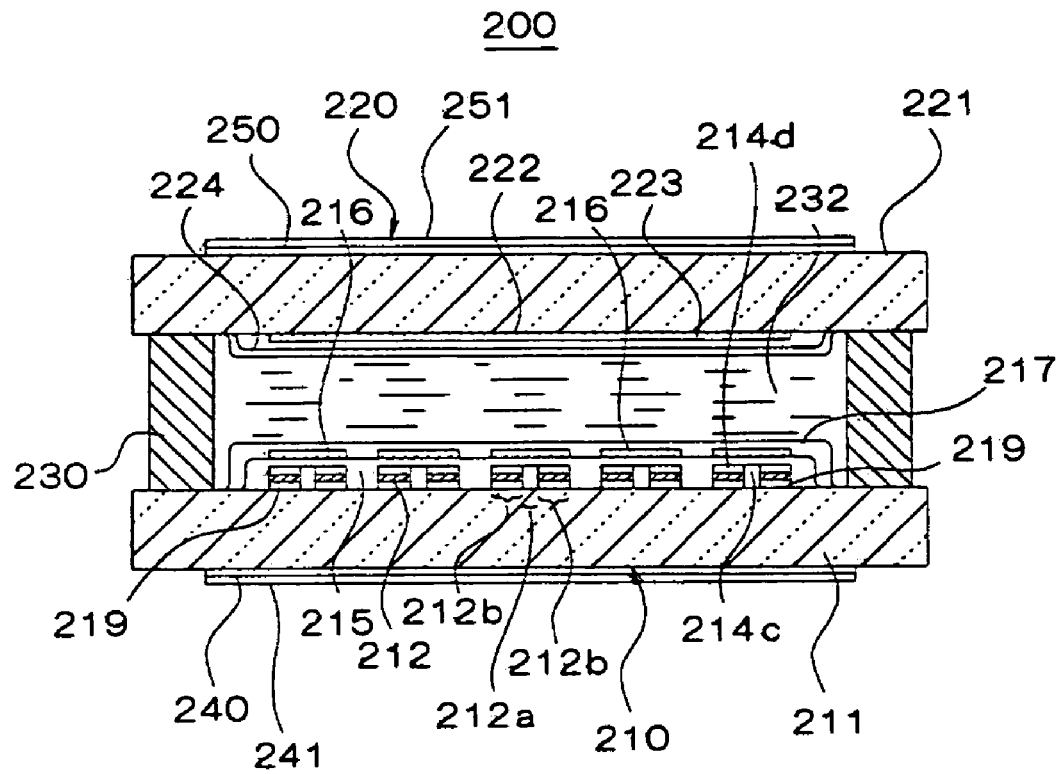
FIG. 9(a) is a schematic cross-sectional view of an electro-optical device having another construction and FIG. 9(b) is an expanded partial plan view illustrating a structure on one side of a substrate.
Figure 9B:
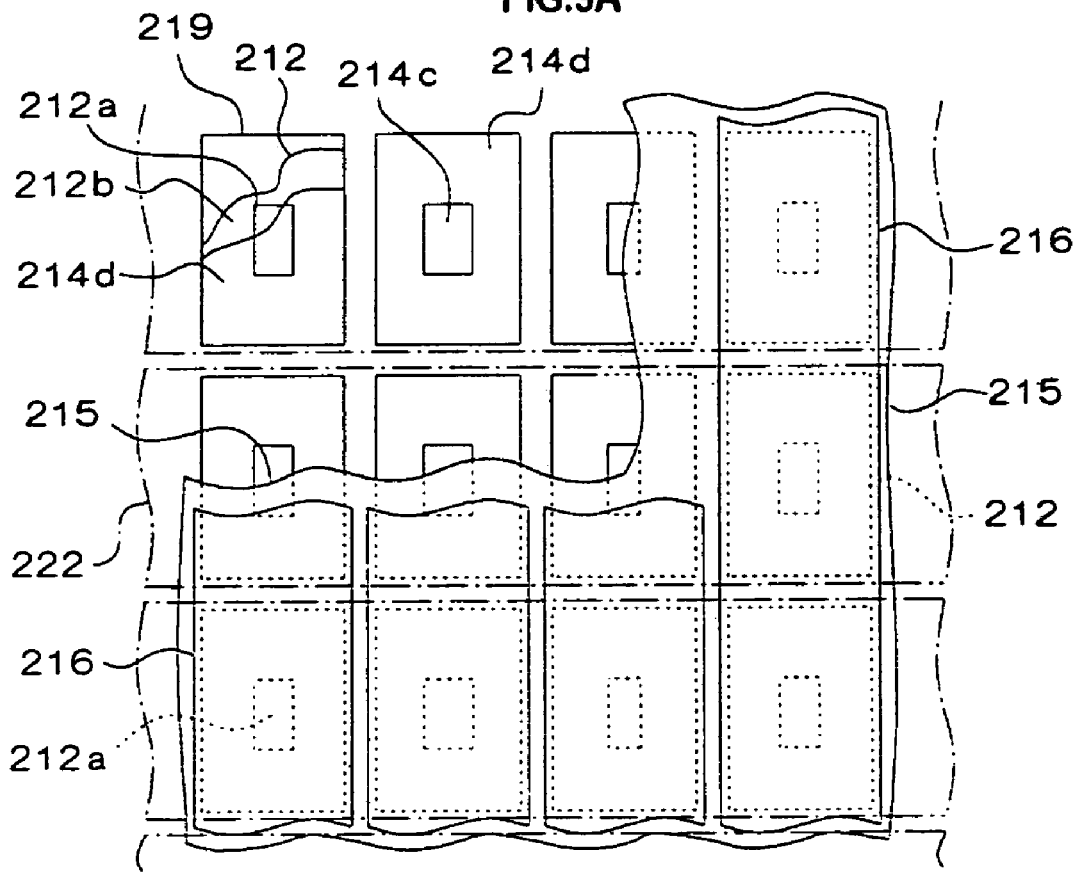

In the first substrate 210 of the present embodiment, a uniform colored layer 214 (for example, any one colored layer of R, G and B) is formed in every pixel, and each colored layer is formed over the light transmitting portion in which the aperture portion 212a is formed and the light reflecting portion in which the reflective layer 212 is formed. However, it is advantageous in that the colored layers in the light transmitting portion and the light reflecting portion are separately formed. FIG. 9 shows a modified example formed in this way. Herein, the same reference numerals are attached to the same portions as the above-mentioned embodiment, and the descriptions of them are omitted.

In the first substrate 210, a dark color portion 214c having a high light concentration and a bright color portion 214d having a light concentration less than the data color portion 214c are provided in the colored layer 214 provided in every pixel. The dark color portion 214c is arranged to overlap in a planar type at least the light transmitting portion. Herein, the light concentration is ability per a unit thickness of the colored layer for shifting a wavelength distribution of light. If the light concentration is high (large), a saturation (colorfulness) of transmitting light increases, and if the light concentration is low (small), the saturation of the transmitting light decreases. If the colored layer contains a colored layer such as a pigment or a dye, the light concentration, normally, is positively related to amount of the colored material. Parameters related to the concept of the color concentration include, for example, may use a Y value in a XYZ colorimetric system or a L* value in a Lab colorimetric system corresponding to a luminous transmittance or a luminosity, that is, an integral value of a spectral transmittance in a visible light region (for example, a light wavelength region of 380 nm to 780 nm). The Y value or L* value is negatively related (for example, an inverse proportion) to the color concentration. Accordingly, the Y value or L* value of the dark color portion is smaller than the Y value or L* value of the bright color portion.

More specifically, in case of the above-mentioned structure example, the dark color portion 214c is formed in the light transmitting portion comprising the aperture portion 212a, and the bright color portion 214d is formed in the light reflecting portion comprising the reflective layer 212. Herein, the dark color portion 214c and the bright color portion 214d are formed not to overlap each other in the example shown in the drawing. However, it is advantageous in that in a boundary region, the dark color portion 214c and the bright color portion 214d are formed to overlap partially each other. In any case, a light transmitting the colored layer just once in the light transmitting portion becomes a display light, and a light transmitting the colored layer twice in a round trip in the light reflecting portion becomes a display light. However, a difference of colors of the transmissive display and the reflective display generated by doing so can be reduced by providing the dark color portion 214c and the bright color portion 214d in every pixel region.

Further, unlike the above-mentioned structure, it is advantageous in that in the light transmitting portion, the colored layer is provided with a thick body portion, and in the light reflecting portion, the colored layer is provided with a thin body portion. In this case, the difference of the colors of the transmissive display and the reflective display can be also reduced, similarly to the above-mentioned structure.

The above-mentioned structure example can be fabricated with a method similar to a fabricating method of the above-mentioned color filter substrate. However, it is necessary to have steps for forming the dark color portion 214c and the bright color portion 214d separately. For example, when forming colored layers of three colors of R, G and B, six steps in total (in case of using the photolithography method, steps including coat, exposure and development) are necessary to be executed. This is similarly applied when forming the thick body portion and the thin body portion. However, in this case, by changing amount of the exposure in the light transmitting portion and the light reflecting portion, it is possible to form simultaneously the thick body portion and the thin body portion by executing the exposure and development one time.

Electronic Apparatus

Figure 10:
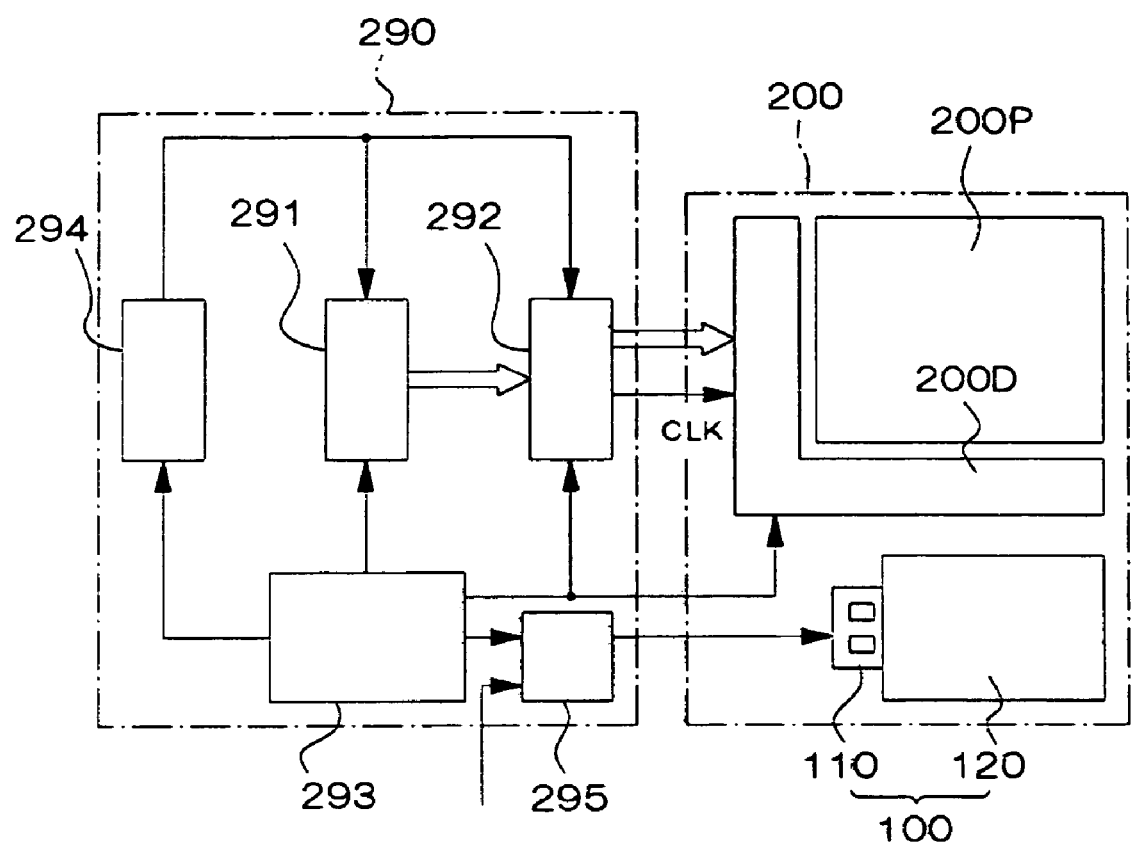
FIG. 10 is a structural block diagram illustrating a structure of a display control system of an electronic apparatus comprising the electro-optical device.

Finally, with reference to FIGS. 10 and 11, an embodiment of an electronic apparatus according to the present invention will be described. In the present embodiment, an electronic apparatus including the above-mentioned electro-optical device (the liquid crystal display device 200) as a display means will be described. FIG. 10 is a schematic block diagram showing an entire structure of a control system (a display control system) to the liquid crystal display device 200 in the electronic apparatus of the present embodiment. The electronic apparatus shown in the drawing has a display control circuit 290 including a display information output source 291, a display information processing circuit 292, a power source circuit 293, a timing generator 294 and a light source control circuit 295. Further, in the above-mentioned liquid crystal display device 200, a driving circuit 200D for driving the above-mentioned liquid crystal panel 200P is provided. The driving circuit 200D comprises an electronic component (a semiconductor IC 261) directly mounted on the liquid crystal panel 200P as described above. However, the driving circuit 200D may comprise, other than the above-mentioned aspect, a circuit pattern formed on the panel surface, a semiconductor IC chip mounted on or a circuit pattern formed on a circuit board electrically connected to the liquid crystal panel, and the like.

The display information output source 291 comprises a memory composed of ROM (Read Only Memory), RAM (Random Access Memory) and the like, a storage unit composed of a magnetic recording disk, an optical recording disk and the like, and a tuning circuit for tuning a digital image signal to output. The display information output source 291 is configured to supply the outputted display information with the display information processing circuit 292 in a type of a predetermined format of an image signal, based on various clock signals generated by the timing generator 294.

The display information processing circuit 292 comprises various well-known circuits such as a serial-parallel conversion circuit, an amplification/inversion circuit, a rotation circuit, a gamma correction circuit, and a clamp circuit. The display information processing circuit 292 executes a process of input display information, and supplies the image information, together with a clock signal CLK; with the driving circuit 200D. The driving circuit 200D includes a scanning line driving circuit, a signal line driving circuit and an inspection circuit. Further, the power source circuit 293 supplies a predetermined voltage with each of the above-mentioned elements.

The light source control circuit 295 supplies a power supplied from the power source circuit 293 with a light source unit 110 of an illumination device 100, based on a control signal introduced from an outside. Light emitted from the light source unit 110 is incident on a light guide plate 120 and is illuminated from the light guide plate 120 to the liquid crystal panel 200P. The light source control circuit 295 controls lighting/non-lighting of each light source of the light source unit 110 in accordance with the control signal. In addition, the brightness of the light source can be controlled.

Figure 11:
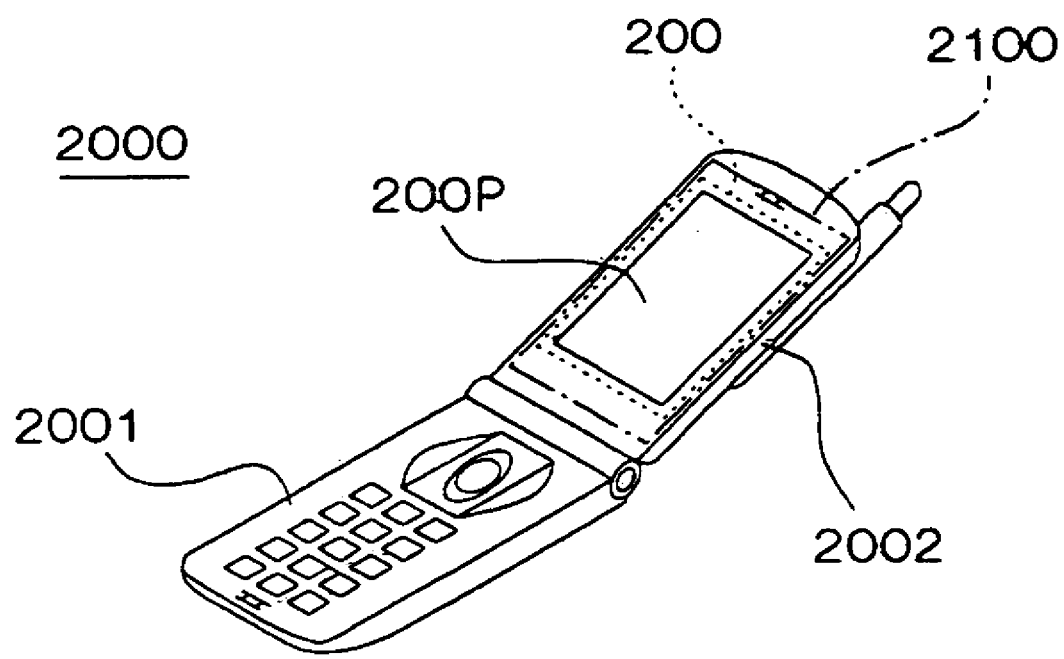
FIG. 11 is a schematic perspective view illustrating an exterior of the electronic apparatus comprising the electro-optical device.

FIG. 11 shows an exterior of a cellular phone which is an example of an electronic apparatus according to the present invention. The electronic apparatus 2000 has an operating unit 2001 and a display unit 2002, and a circuit board 2100 is arranged in the display unit 2002. On the circuit board 2100, the liquid crystal display device 200 as described above is mounted. In a surface of the display unit 2002, the liquid crystal panel 200P is configured to be visible.

Moreover, the electro-optical device of the present invention can also be applied to not only a passive matrix type liquid crystal display device as shown in the drawing, but also an active matrix type liquid crystal display device (for example, a liquid crystal display device comprising TFT (thin film transistor) or TFD (thin film diode) as a switching element). Further, the present invention can be similarly applied to various electro-optical devices such as an electro-luminescence device, an organic electro-luminescence device, a plasma display device, an electrophoresis display device, a device using a field emission element (Field Emission Display, Surface-Conduction Electron-Emitter Display and the like), as well as the liquid crystal display device.

What is claimed is:

1. An electro-optical device comprising:
an electro-optical material;
a first color filter;
a second color filter with a color different from color of the first color filter; and
a plurality of pixel regions separately controlling optical states of the electro-optical material, the pixel regions including a first color pixel region that corresponds to the first color filter and a second color pixel region that corresponds to the second color filter, the first and second pixel regions being arranged in a predetermined first direction, the first pixel region including a light transmitting portion and a light reflecting portion, the second pixel region including a group of light transmitting portions having a greater number of light transmitting portions than the first pixel region and a light reflecting portion, wherein:

the light transmitting portion of the first pixel region has two edges opposing each other and spaced apart in a second direction orthogonal to the first direction, the second pixel region group of light transmitting portions is generally arranged along the second direction, and the second pixel region group includes two edges of individual light transmitting portions that are most peripheral in the second direction and that are aligned with the two edges of the light transmitting portion of the first pixel region.

* * * * *